(12) United States Patent
Schultz et al.

(10) Patent No.: US 8,930,935 B2
(45) Date of Patent: Jan. 6, 2015

(54) COMPOSITE SERVICE REFACTORING

(75) Inventors: Paul T. Schultz, Colorado Springs, CO (US); Timothy M. Dwight, Richardson, TX (US); Mark J. Hahn, Stow, MA (US); Martin W. McKee, Herndon, VA (US); Robert A. Sartini, Colorado Springs, CO (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 1043 days.

(21) Appl. No.: 12/647,855

(22) Filed: Dec. 28, 2009

(65) Prior Publication Data

US 2011/0161911 A1   Jun. 30, 2011

(51) Int. Cl.
   *G06F 9/44* (2006.01)
   *G06F 9/45* (2006.01)
   *G06F 15/177* (2006.01)

(52) U.S. Cl.
   CPC ... *G06F 8/71* (2013.01); *G06F 8/36* (2013.01)
   USPC ............ 717/171; 717/120; 717/159; 709/221

(58) Field of Classification Search
   None
   See application file for complete search history.

(56) References Cited

U.S. PATENT DOCUMENTS

| | | | | |
|---|---|---|---|---|
| 6,311,324 | B1* | 10/2001 | Smith et al. | 717/114 |
| 6,983,463 | B1* | 1/2006 | Hunt | 719/316 |
| 7,584,276 | B2* | 9/2009 | Chafle et al. | 709/223 |
| 7,640,542 | B2* | 12/2009 | Herenyi et al. | 717/177 |
| 8,248,992 | B2* | 8/2012 | Kim | 370/328 |
| 8,549,541 | B2* | 10/2013 | Moyer et al. | 719/318 |
| 2005/0132381 | A1* | 6/2005 | Fiammante et al. | 719/310 |
| 2007/0073883 | A1* | 3/2007 | Chafle et al. | 709/226 |
| 2007/0294387 | A1* | 12/2007 | Martin | 709/224 |
| 2008/0046882 | A1* | 2/2008 | Blackhouse | 717/174 |
| 2009/0228896 | A1* | 9/2009 | Meijer et al. | 719/313 |
| 2010/0070948 | A1* | 3/2010 | Rama et al. | 717/105 |
| 2010/0153940 | A1* | 6/2010 | Remmel et al. | 717/168 |

OTHER PUBLICATIONS

OSGi Alliance, OSGI Service Platform Core Specification Release 4 Version 4.1 [online], Apr. 2007 [retrieved Sep. 10, 2012], Retrieved from Internet <http://www.osgi.org/download/r4v41/r4.core.pdf>, pp. i-288.*

Amiri, K., et al. "Dynamic Function Placement for Data-intensive Cluster Computing," USENIX Annual Technical Conference [online], 2000 [retrieved Apr. 4, 2014], Retrieved from Internet: <URL: http://citeseerx.ist.psu.edu/viewdoc/download?doi=10.1.1.34.8452&rep=rep1&type=pdf>, pp. 1-16.*

* cited by examiner

*Primary Examiner* — Don Wong
*Assistant Examiner* — Todd Aguilera

(57) ABSTRACT

A network device may include a memory to store instructions. The network device may further include a processor to execute the instructions to obtain information relating to a loosely-coupled composite service, where the loosely-coupled composite service includes a group of services. The processor may further execute the instructions to analyze the obtained information to determine one or more design recommendations, and re-factor the loosely-coupled composite service as a target composite platform based on at least one of the one or more design recommendations.

17 Claims, 8 Drawing Sheets

COMPOSITE SERVICE REFACTORING

BACKGROUND INFORMATION

Service providers desire the ability to rapidly "try" many different service ideas, and then rapidly deploy and scale up the winners. Existing technologies, including web services, Business Process Execution Language (BPEL), Enterprise Service Bus (ESB), and applications servers, can be used by non-computer programmers to "stitch together" services from service building blocks (e.g., web services) to create a loosely-coupled composite service.

DETAILED DESCRIPTION OF PREFERRED EMBODIMENTS

The following detailed description of embodiments refers to the accompanying drawings. The same reference numbers in different drawings may identify the same or similar elements. Also, the following detailed description does not limit the invention.

Systems and methods, as described herein, provide the ability to re-factor a rapidly developed, loosely-coupled composite service into a high performance, high reliability, and massively scalable version of the composite service. The term "refactoring," as used herein, refers to a process of changing the internal structure of a composite service, without necessarily modifying the external functional behavior. In some instance, the refactoring may intentionally cause the exterior behavior to change (e.g., by adding capabilities, such as additional codecs offered within Session Initiation Protocol (SIP) messaging, supporting additional enabler methods, etc.).

Figure 1:
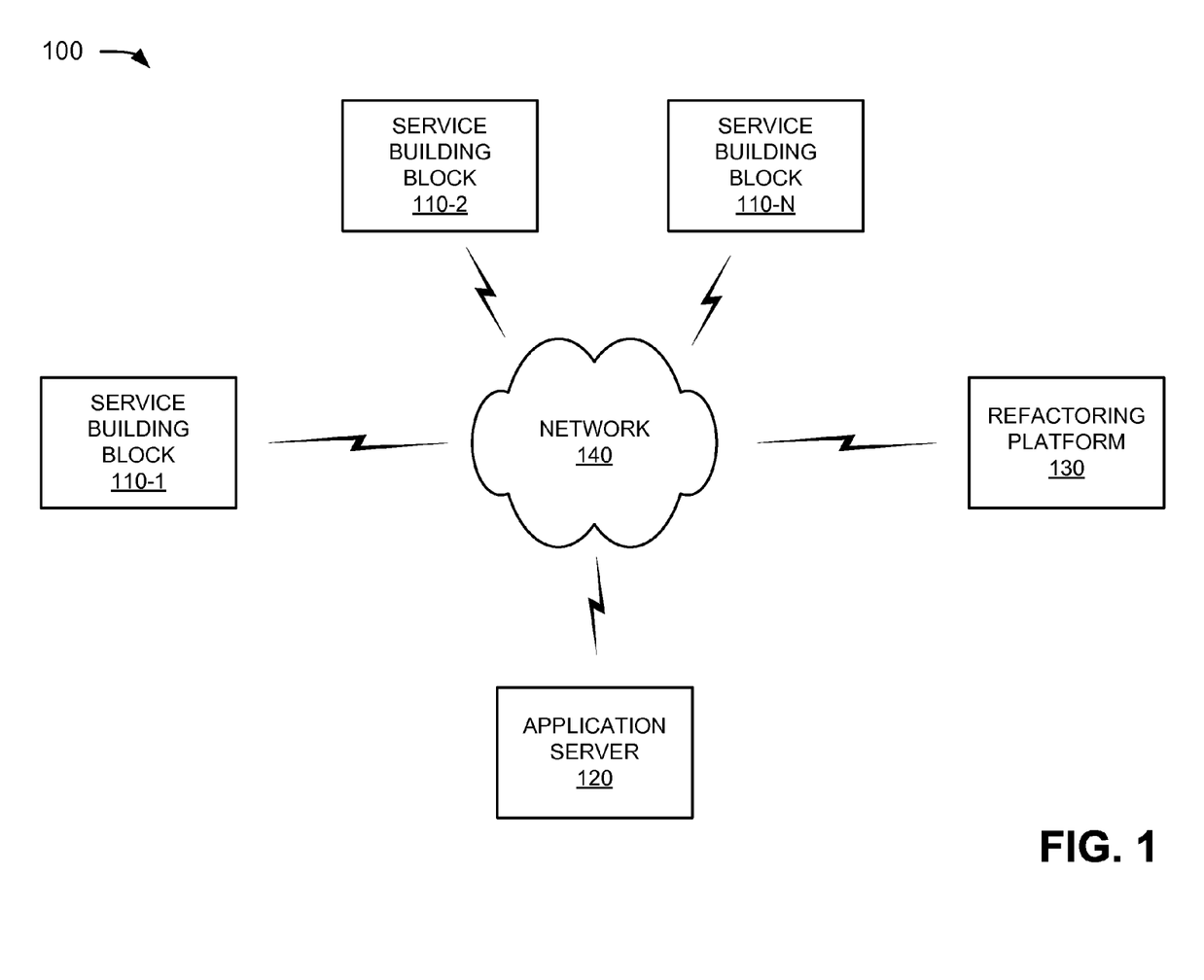
FIG. 1 is an exemplary environment in which systems and/or methods, described herein, may be implemented.

FIG. 1 is an exemplary environment 100 in which systems and/or methods, described herein, may be implemented. As illustrated, environment 100 may include a group of service building blocks 110-1 through 110-N (referred to collectively as "service building blocks 110" and in some instances, singularly, as "service building block 110") that may be accessed by an application server 120 and a refactoring platform 130 via a network 140.

Service building blocks 110 may include services that may be accessed over a network. The services may include web-based services and non-web-based services. For example, service building blocks 110 may include security services, authentication services, directory services, email services, printing services, network file sharing services, multimedia services, location services, presence services, address book services, calendar services, telecommunication-related services (such as a session initiation service, a call transfer service, a call forwarding service, a call waiting service, a conferencing service, a prepaid calling card service and/or account card calling service, etc.), and/or other types of services. Each service building block 110 may be implemented on one or more devices. The devices may include servers, mainframe computers, desktop computers, laptop computers, and/or other types of computational or communication devices. Service building blocks 110 may be accessed through network 140 via wired and/or wireless connections.

Application server 120 may include one or more network devices that may combine a group of service building blocks (such as service building blocks 110) to form a loosely-coupled composite service, a tightly-coupled composite service, or a composite service that combines one or more loosely-coupled service building blocks and one or more tightly-coupled service building blocks. For example, application server 120 may include one or more servers, mainframe computers, desktop computers, laptop computers, and/or other types of computational or communication devices. In some implementations, application server 120 may be considered to be a Service Logic Execution Environment (SLEE). In one implementation, application server 120 may include, for example, Business Process Execution Language (BPEL) code, a converged HTTP/SIP application server environment, and/or a JSR 289 Application Router that may be used to implement the loosely-couple composite service on application server 120. Application server 120 may connect to network 140 via wired and/or wireless connections.

Refactoring platform 130 may re-factor a loosely-coupled composite service (e.g., implemented by application server 120) to form a target composite service (which may correspond to a tightly-coupled composite service or a composite service that combines one or more loosely-coupled service building blocks and one or more tightly-coupled service building blocks). Refactoring platform 130 may include one or more network devices or be implemented on one or more network devices. For example, refactoring platform 130 may include or be implemented on one or more servers, mainframe computers, desktop computers, laptop computers, and/or other types of computational or communication devices. In one implementation, refactoring platform 130 may receive information relating to the loosely-coupled composite service and may use this information to provide one or more recommendations for forming a target composite service. Refactoring platform 130 may also provide graphical user interfaces that allow a user to provide input as to how the target composite service is to be formed. Refactoring platform 130 may further perform one or more operations for forming the target composite service. Refactoring platform 130 may connect to network 140 via wired and/or wireless connections.

Network 140 may include one or more networks of any type, including a Public Land Mobile Network (PLMN), a Public Switched Telephone Network (PSTN), a Local Area Network (LAN), a Metropolitan Area Network (MAN), a Wide Area Network (WAN), a private network, the Internet, an intranet, an Internet Protocol Multimedia Subsystem (IMS) network, and/or another type of network.

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform the tasks described as being performed by one or more other components of environment 100.

Figure 2:
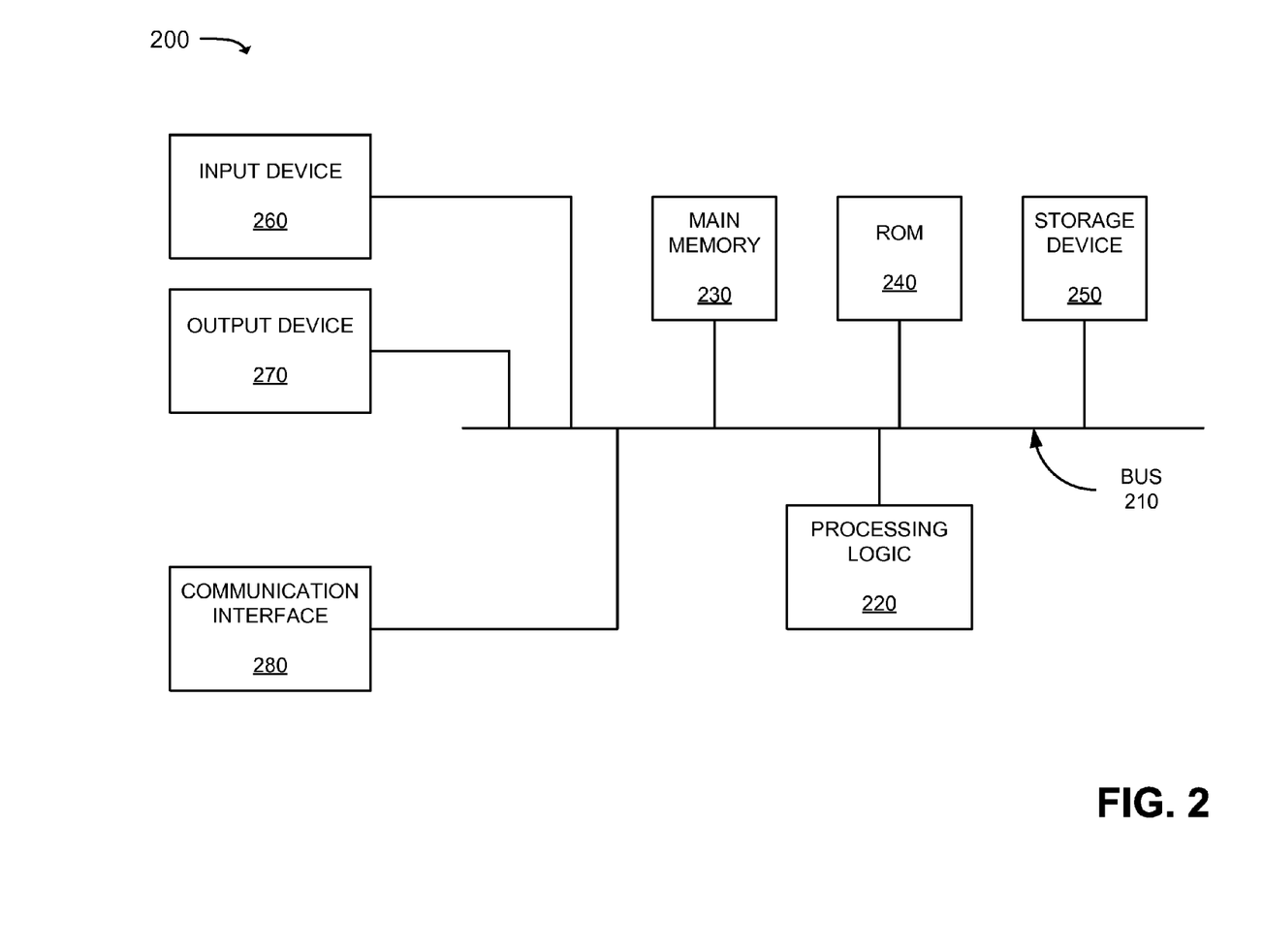
FIG. 2 is a block diagram of exemplary components of a device of FIG. 1.

FIG. 2 is a block diagram of exemplary components of a device 200 that may correspond to a device on which a service building block 110 is implemented, application server 120, or refactoring platform 130. As illustrated, device 200 may include a bus 210, processing logic 220, a main memory 230, a read only memory (ROM) 240, a storage device 250, an input device 260, an output device 270, and a communications interface 280.

Bus 210 may permit communication among the components of device 200. Processing logic 220 may include one or more processors and/or microprocessors that interpret and execute instructions. In some implementations, processing logic 220 may be implemented as or include one or more Application Specific Integrated Circuits (ASICs), Field Programmable Gate Arrays (FPGAs), or the like. Main memory 230 may include a Random Access Memory (RAM) or another type of dynamic storage device that stores information and instructions for execution by processing logic 220. ROM may include a ROM device and/or another type of static storage device that stores static information and instructions for the processing logic 220. Storage device 250 may include a magnetic or optical recording medium and its corresponding drive for storing information and/or instructions.

Input device 260 may include a device that permits an operator to input information to device 200, such as a keyboard, a keypad, a mouse, a pen, a microphone, one or more biometric mechanisms, a touch screen display, and/or other types of input devices. Output device 270 may include a device that outputs information to the operator, including a display, a printer, a speaker, etc.

Communication interface 280 may include any transceiver-like mechanism that enables device 200 to communicate with other devices and/or systems. For example, communication interface 280 may include mechanisms for communicating with another device or system via a network, such as network 140.

As will be described in detail below, device 200 may perform certain operations. Device 200 may perform these and other operations in response to processing logic 220 executing software instructions contained in a computer-readable medium, such as main memory 230. A computer-readable medium may correspond to, for example, a physical memory device or a logical memory device. A logical memory device may include memory space within a single physical memory device or spread across multiple physical memory devices residing on one or more devices.

The software instructions may be read into main memory 230 from another computer-readable medium, such as data storage device 250, or from another device via communication interface 280. The software instructions contained in main memory 230 may cause processing logic 220 to perform processes that will be described later. Alternatively, hardwired circuitry may be used in place of or in combination with software instructions to implement processes described herein. Thus, systems and methods described herein are not limited to any specific combination of hardware circuitry and software.

Although FIG. 2 illustrates exemplary components of device 200, in other implementations, device 200 may include fewer components, different components, differently arranged components, or additional components than those depicted in FIG. 2. Additionally, or alternatively, one or more components of device 200 may perform one or more tasks described as being performed by one or more other components of device 200.

Figure 3:
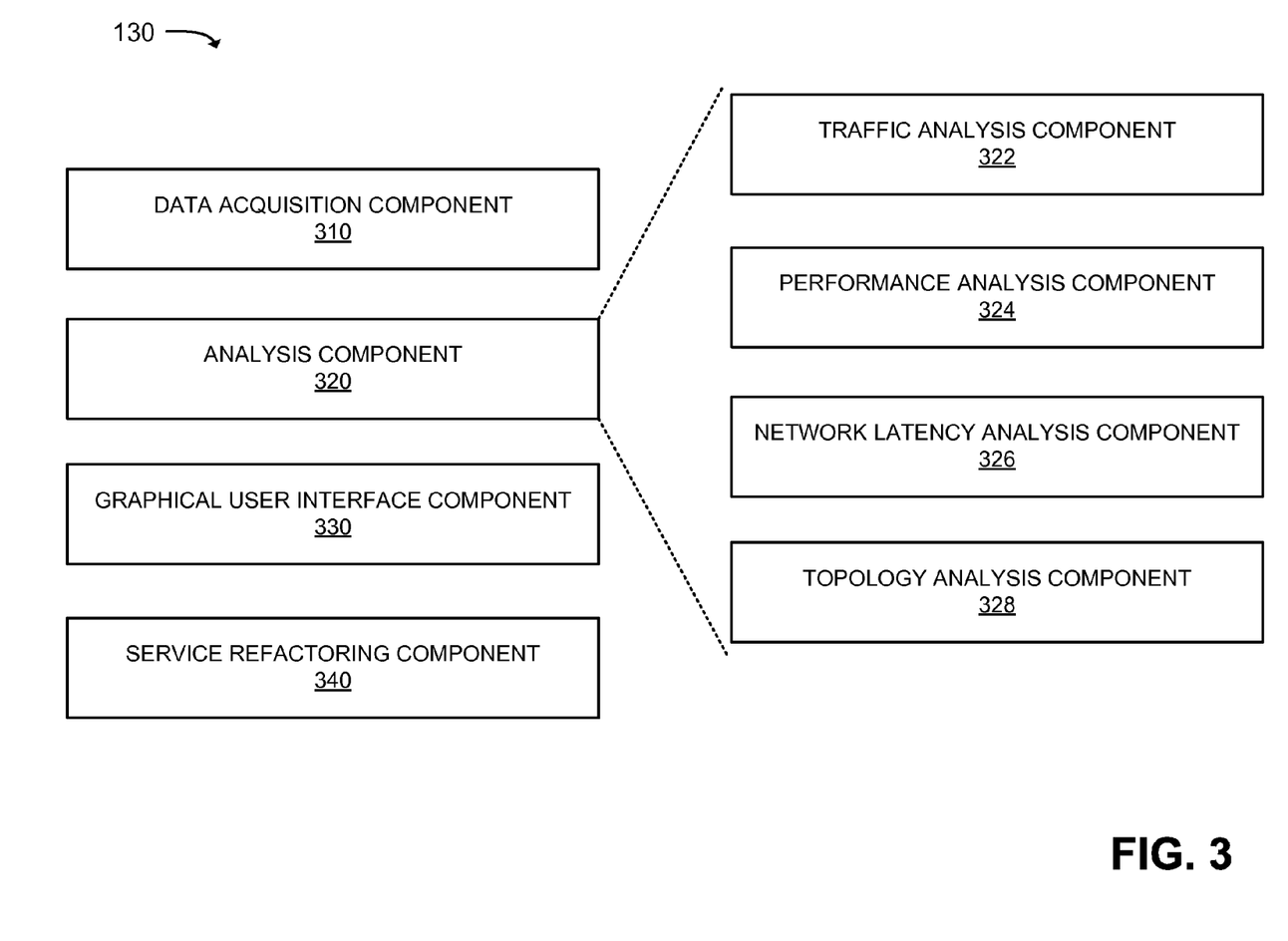
FIG. 3 is a diagram of exemplary functional components of a refactoring platform of FIG. 1.

FIG. 3 is a diagram of exemplary functional components of refactoring platform 130. As illustrated, refactoring platform 130 may include a data acquisition component 310, an analysis component 320, a graphical user interface component 330, and a service refactoring component 340. Data acquisition component 310, analysis component 320, graphical user interface component 330, and service refactoring component 340 may be implemented in hardware or a combination of hardware and software. In one implementation, data acquisition component 310, analysis component 320, graphical user interface component 330, and service refactoring component 340 may be implemented via one or more components illustrated in FIG. 2.

Data acquisition component 310 may receive information relating to a loosely-coupled composite service that is implemented on application server 120. The information may include, for example, information describing service building blocks 110 of the loosely-coupled composite service, information relating to implementation of service building blocks 110, information regarding the application server 120-to-service building blocks 110 interfaces, information regarding application server 120, and/or other information relating to the loosely-coupled composite service (such as network latency information relating to service building blocks 110, network topology information, and/or other types of information). In fact, the received information may include any type of information that may be used for improving the performance, the reliability, and/or the scalability of the loosely-coupled composite service.

Data acquisition component 310 may include, for example, a component that uses Universal Description Discovery and Integration (UDDI), Web Services Inspection Language (WSIL), and/or Web Services Description Language (WSDL) to obtain the information describing service building blocks 110 of the loosely-coupled composite service. The information may include, for example, an entity that controls each service building block 110 (e.g., whether a particular service building block is controlled by the same entity that controls refactoring platform 130 or whether a third party controls the particular service building block), the capabilities of each service building block 110, information indicating how each service building block 110 works, information for constructing a base JAVA class for each service building block 110 (e.g., if the target composite service is going to be implemented in JAVA), and/or other types of information.

Data acquisition component 310 may additionally, or alternatively, include a component that obtains any available source code (or the methods that are available) for service building blocks 110. Data acquisition component 310 may further, or alternatively, include a component that captures traffic transmitted between application server 120 and service building blocks 110 of the loosely-coupled composite service. For example, while the loosely-coupled composite service is being executed, data acquisition component 310 may capture messages transmitted between service building blocks 110 and application server 120. The messages may provide an indication of the composite service call flow, message contents, and message resource requirements (such as message sizes, content types, etc.).

Data acquisition component 310 may also or alternatively include a component that obtains details of application server 120 (such as, for example, the BPEL code and JSR 289 Application Router Java class implementation used to implement the loosely-coupled composite service on application server 120, and memory requirements, processor utilization, threads, input/output requirements, etc. relating to implementation of the loosely-coupled composite service). Data acquisition component 310 may additionally, or alternatively, include a component that obtains latency information relating to service building blocks 110. For example, while the loosely-coupled composite service is being executed, data acquisition component 310 may track the delays relating to service building blocks 110. A service building block that provides very slow responses may, for example, be determined to be a good candidate for being tightly coupled.

Data acquisition component 310 may additionally, or alternatively, include a component (such as the traceroute tool) that determines the route taken by packets across an IP network and obtains topology information regarding the geographic locations of the devices involved in implementing the loosely-coupled composite service. Data acquisition component 310 may also include other components that obtain additional information relating to the loosely-coupled composite service that may be useful for providing recommendations for forming a target composite service. For example, data acquisition component 310 may obtain information from a user regarding the target composite service (e.g., information as to how individual service building blocks 110 are to be coupled).

Analysis component 320 may process the information received by data acquisition component 310 to determine the operating behavior of the loosely-coupled composite service and, based on this operating behavior, provide one or more design recommendations relating to forming a target composite service. For example, analysis component 320 may process the information describing service building blocks 110 of the loosely-coupled composite service, the information relating to implementation of service building blocks 110, the information regarding the application server 120-to-service building blocks 110 interfaces, the information regarding application server 120, and/or the other information acquired by data acquisition component 310 to identify design recommendations (or options), from which a user may select, with respect to forming a target composite service from service building blocks 110. For example, analysis component 320 may recommend that one or more service building blocks 110 may be less loosely coupled, while one or more other service building blocks 110 may be more tightly coupled by, for example, implementing these service building blocks within a Java application. As another example, analysis component 320 may recommend that the performance of one or more service building blocks 110 may be enhanced by using a lower latency interface, such as Remote Method Invocation (RMI) or a subroutine call, as opposed to interfacing with a web server interface over a network. As another example, analysis component 320 may recommend that the performance of one or more service building blocks 110 may be enhanced by implementing a service building block physically closer to application server 120 to reduce network latency. In one implementation, analysis component 320 may provide information indicating the benefit of selecting a particular design recommendation (e.g., that the design recommendation improves performance, improves reliability, improves scalability, etc.).

As illustrated, analysis component 320 may include a traffic analysis component 322, a performance analysis component 324, a network latency analysis component 326, and a topology analysis component 328. Traffic analysis component 322 may receive traffic transmitted between application server 120 and service building blocks 110 of the loosely-coupled composite service, analyze the received traffic, and provide one or more recommendations in response to the analysis of the received traffic. For example, traffic analysis component 322 may analyze, based on the messages sent between a service building block 110 and application server 120, information that may be useful in determining how service building block 110 operates. Other information may alternatively be gleaned from an analysis of the traffic between service building blocks 110 and application server 120. In one implementation, traffic analysis component 322 may be implemented using Wireshark® or another traffic (or packet) analyzer application.

Performance analysis component 324 may make one or more recommendations by analyzing the source code that implements service building blocks 110. For example, performance analysis component 324 may analyze the source code of a particular service building block and provide, based on the analysis, a recommendation that performance of the particular service building block may be enhanced by translating all or a portion of the source code from a first programming language to a second programming language. As an example, performance analysis component 324 may analyze the source code of a particular service building block to identify, for example, sections of the source code that execute many times. Performance analysis component 324 may recommend that those identified sections be rewritten in a different language, which may allow the source code to execute more quickly. As another example, performance analysis component 324 may analyze the source code of a particular service building block to identify, for example, sections of the source code that are unnecessary or that may be optimized by rewriting the source code in a different language. Performance analysis component 324 may then provide design recommendations for the identified sections. In one implementation, performance analysis component 324 may be implemented using Rational® Purify® or another software analysis tool.

Network latency analysis component 326 may make one or more recommendations by analyzing network latency information relating to service building blocks 110. For example, network latency analysis component 326 may analyze latency information relating to accessing a particular service building block and provide one or more recommendations to enhance performance of the loosely-coupled composite service. For example, if network latency analysis component 326 determines that latency is an issue with respect to a particular service building block that is accessed often, network latency analysis component 326 may recommend implementing that service building block locally (e.g., by implementing the service building block in the application server that is going to implement the target composite service, or by keeping the service as loosely coupled, but implementing the service building block at several different geographic locations to reduce the lag time in accessing the service building block).

Topology analysis component 328 may make one or more recommendations by analyzing network information relating to the geographic location of the devices that implement service building blocks 110 and/or the geographic location of devices that store (or provide) information that may be needed by service building blocks 110. For example, topology analysis component 328 may analyze network topology information relating to a particular service building block (possibly in connection with network latency information) and provide one or more design recommendations that enhance performance of the loosely-coupled composite service. As an example, topology analysis component 328 may identify that access to a particular service building block, which has been identified as having a latency issue, traverses multiple firewalls. Thus, topology analysis component 328 may recommend that the service building block be implemented locally to improve the latency and remove the delays in traversing the firewalls.

Although FIG. 3 shows exemplary functional components of analysis component 320, in other implementations, analysis component 320 may include fewer functional components, different functional components, differently arranged functional components, or additional functional components than depicted in FIG. 3. Additionally, or alternatively, one or more functional components of analysis component 320 may perform the tasks described as being performed by one or more other functional components of analysis component 320.

Graphical user interface component 330 may provide one or more graphical user interfaces to a user relating to forming a target composite service. For example, graphical user interface component 330 may provide one or more graphical user interfaces that provide recommendations, obtained from analysis component 320, to the user and allow the user to make coupling and other design decisions for forming a target composite service.

Service refactoring component 340 may form a target composite service based on the information received via data acquisition component 310 and/or graphical user interface component 330. Service refactoring component 340 may cause the target composite service to be implemented on one or more application servers, such as application server 120.

Although FIG. 3 shows exemplary functional components of refactoring platform 130, in other implementations, refactoring platform 130 may include fewer functional components, different functional components, differently arranged functional components, or additional functional components than depicted in FIG. 3. Additionally, or alternatively, one or more functional components of refactoring platform 130 may perform the tasks described as being performed by one or more other functional components of refactoring platform 130.

Figure 4:
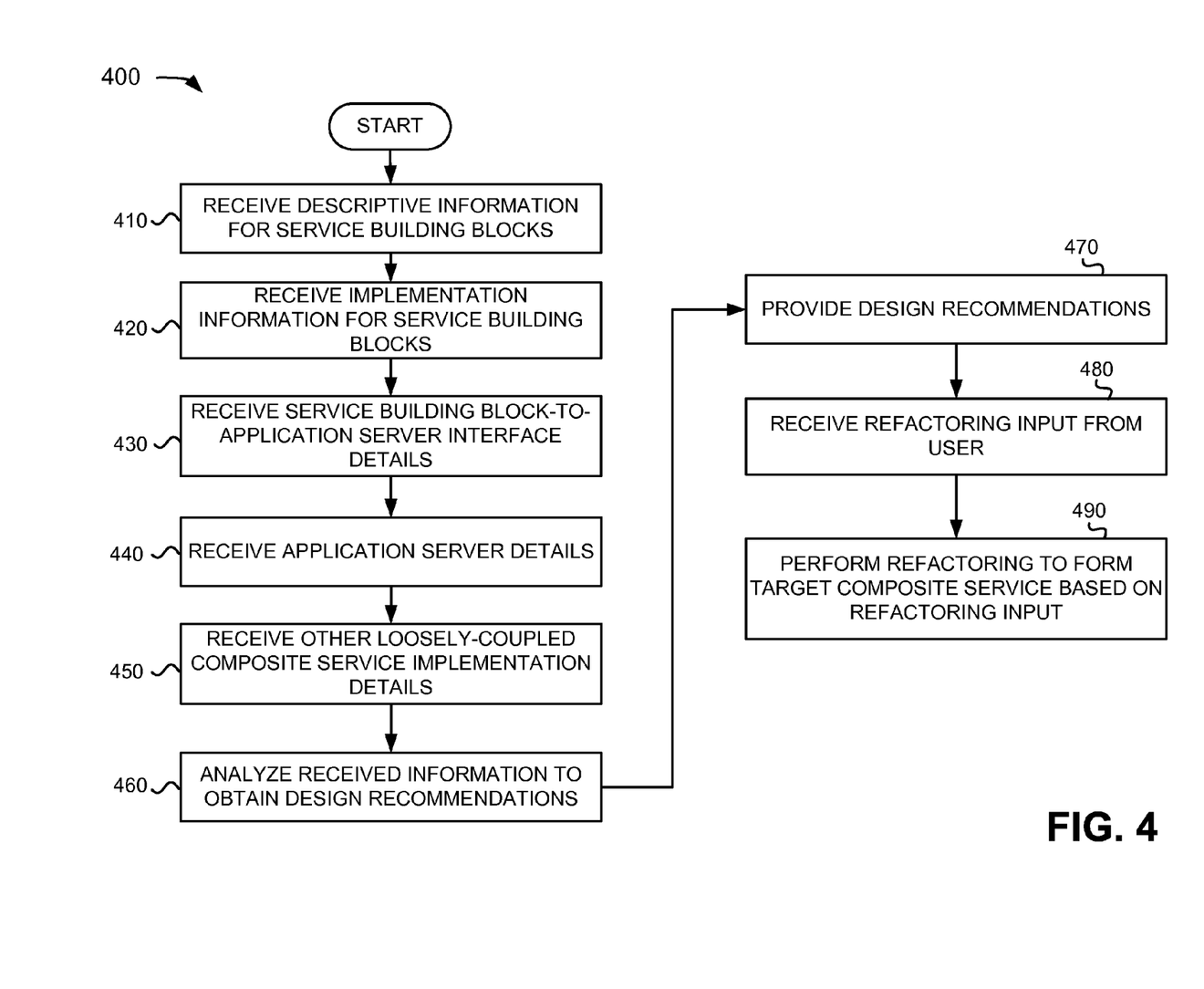
FIG. 4 is a flow chart of an exemplary process for forming a target composite service.

FIG. 4 is a flow chart of an exemplary process 400 for forming a tightly-coupled composite service. In one implementation, the processing of FIG. 4 may be performed by refactoring platform 130. In another implementation, some or all of the processing described below may be performed by one or more devices, including or excluding refactoring platform 130.

Process 400 may include receiving descriptive information for the service building blocks of a loosely-couple composite service (block 410). For example, refactoring platform 130 (e.g., data acquisition component 310) may use UDDI, WSIL, and/or WSDL to obtain information describing service building blocks 110 of the loosely-coupled composite service. The information may include, for example, an entity that controls each service building block 110 (e.g., whether a particular service building block is controlled by the same entity that controls refactoring platform 130 or whether a third party controls the particular service building block), the capabilities of each service building block 110, information indicating how each service building block 110 works, information for constructing a base Java class for each service building block 110 (e.g., if the target composite service is going to be implemented as a Java application), and/or other types of information.

Process 400 may also include receiving implementation information for the service building blocks (block 420). For example, refactoring platform 130 (e.g., data acquisition component 310) may obtain any available source code (or the methods that are available) for each service building block 110. In addition, refactoring platform 130 (e.g., data acquisition component 310) may obtain information identifying the source code that is obtained (e.g., the language in which the source code is written).

Process 400 may further include receiving service building block-to-application server interface details (block 430). For example, refactoring platform 130 (e.g., data acquisition component 310) may capture traffic transmitted between application server 120 and each service building block 110 of the loosely-coupled composite service. For example, while the loosely-coupled composite service is being utilized, data acquisition component 310 may capture messages transmitted between service building blocks 110 and application server 120. The captured messages may include, for example, details regarding the information that is input to and output from service building blocks 110.

Process 400 may include receiving information relating to the application server that implements the loosely-coupled composite service (block 440). For example, refactoring platform 130 (e.g., data acquisition component 310) may obtain the BPEL code and JSR 289 Application Router Java class implementation used to implement the loosely-coupled composite service on application server 120. In addition, data acquisition component 310 may obtain information regarding the memory requirements, the processor utilization, the threads, the input/output requirements, etc. of application server 120 relating to implementation of the loosely-coupled composite service.

Process 400 may further include receiving other implementation details relating to the loosely-coupled composite service (block 450). For example, refactoring platform 130 (e.g., data acquisition component 310) may obtain information regarding the latency of accessing service building blocks 110. For example, while the loosely-coupled composite service is being executed, data acquisition component 310 may track the delays associated with service building blocks 110. Additionally, or alternatively, data acquisition component 310 may obtain topology information regarding the geographic locations of the devices used in implementing the loosely-coupled composite service and/or other information relating to the loosely-coupled composite service that may be useful for providing recommendations for improving the performance, reliability, and/or scalability of the loosely-coupled composite service. For example, data acquisition component 310 may obtain information from a user regarding the target composite service (e.g., the programming language in which the target composite service is to be implemented, how particular service building blocks are to be coupled, etc.).

Process 400 may also include analyzing the received information to obtain design recommendations (block 460). For example, refactoring platform 130 (e.g., analysis component 320) may process the information describing service building blocks 110 of the loosely-coupled composite service, the information relating to implementation of service building blocks 110, the information regarding the application server 120-to-service building blocks 110 interfaces, the information regarding application server 120, and/or the other loosely-coupled composite service details to determine the operating behavior of the loosely-coupled composite service. In addition, data analysis component 320 may, based on this operating behavior, obtain one or more design recommendations relating to forming a target composite service. For example, analysis component 320 may recommend that one or service building blocks 110 may be less loosely coupled, while one or more other service building blocks 110 may be more tightly coupled by, for example, implementing these service building blocks within a Java application. As another example, analysis component 320 may recommend that performance of one or more service building blocks 110 may be enhanced by using a lower latency/higher performance interface, such as RMI or a subroutine call, as opposed to interfacing with a web server interface over a network.

Process 400 may include providing the design recommendations (block 470). For example, refactoring platform 130 (e.g., graphical user interface component 330) may cause a graphical user interface to be provided to a user that includes the design recommendations. The graphical user interface may provide a list of the recommendations (possibly ranked based on one or more criteria) and allow the user to select which, if any, of the design recommendations are to be used for forming the target composite service.

Process 400 may further include receiving a refactoring input from the user (block 480). For example, refactoring platform 130 (e.g., graphical user interface component 330) may receive an input from the user indicating which, if any, of the design recommendations are to be used for forming the target composite service.

Process 400 may also include performing refactoring to form the target composite service, based on the received refactoring input (block 490). For example, refactoring platform 130 (e.g., service refactoring component 340) may cause the user-selected design recommendations to be implemented to form the target composite service. The target composite service may be a high performance, high reliability, and massively scalable version of the loosely-coupled composite service. As one example, service refactoring component 340 may convert service building blocks 110 into Open Services Gateway initiative (OSGI) service components. In addition, service refactoring component 340 may convert service building block messaging interfaces into inter-process communications. Further, service refactoring component 340 may create an OSGI Manifest for the description, maintenance, and upgrade of the OSGI service components and produce the target composite service as an OSGI bundle that can run, for example, within a JAVA Virtual Machine (JVM). Other service refactoring may alternatively be performed.

Although FIG. 4 shows exemplary blocks of process 400, in other implementations, process 400 may include fewer blocks, different blocks, differently arranged blocks, or additional blocks than depicted in FIG. 4.

FIGS. 5A-5D are an example 500 of process 400 described above with respect to FIG. 4. In example 500, assume that a product designer desires to test a new loosely-coupled composite service 510 in an IMS environment to determine whether users would be interested in the new composite service. As illustrated, loosely-coupled composite service 510 may include a location web service 512, an address book web service 514, a calendar web service 516, and an application server 520 that implements loosely-coupled composite service 510. Application server 520 may access each of web services 512/514/516 over a network 518 (e.g., the Internet). The IMS environment may include a group of user devices 526 that are served by a Serving Call Session Control Function (S-CSCF) 522. User devices 526 may connect to an access network 524 via a wired connection or through a wireless network 530. Once loosely-coupled composite service 510 has been rolled out and is available for use by user devices 526, user devices 526 may utilize new loosely-coupled composite service 510 through S-CSCF 522.

Figure 5A:
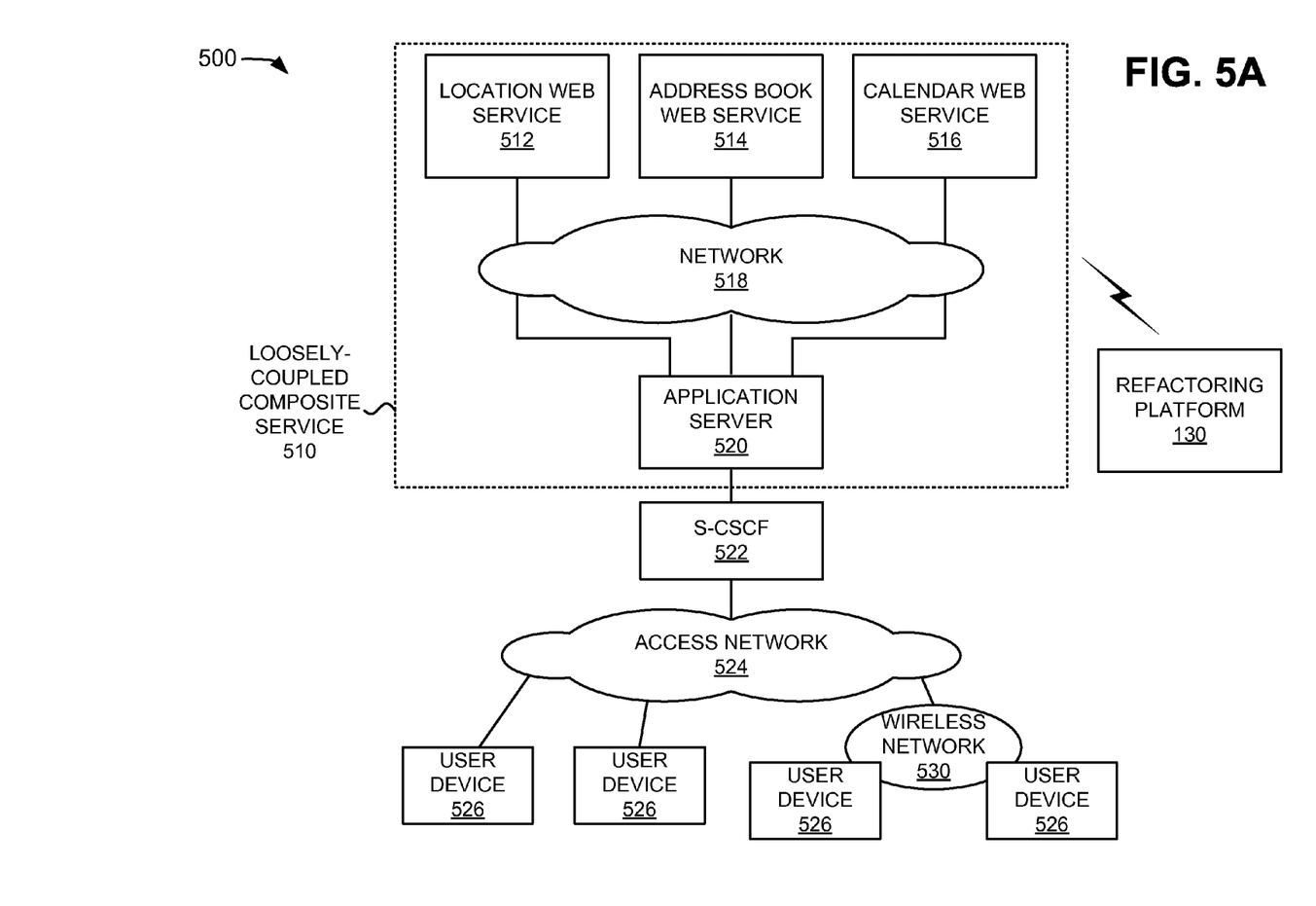
FIGS. 5A-5D are an example of the process described in FIG. 4.

Assume that at some later point in time, the product designer determines that, due to the popularity of loosely-coupled composite service 510, loosely-coupled composite service 510 is to be provided on a permanent basis. The product designer may use refactoring platform 130 to re-factor loosely-coupled composite service into a target composite service that provides higher performance, reliability, and scalability.

Figure 5B:
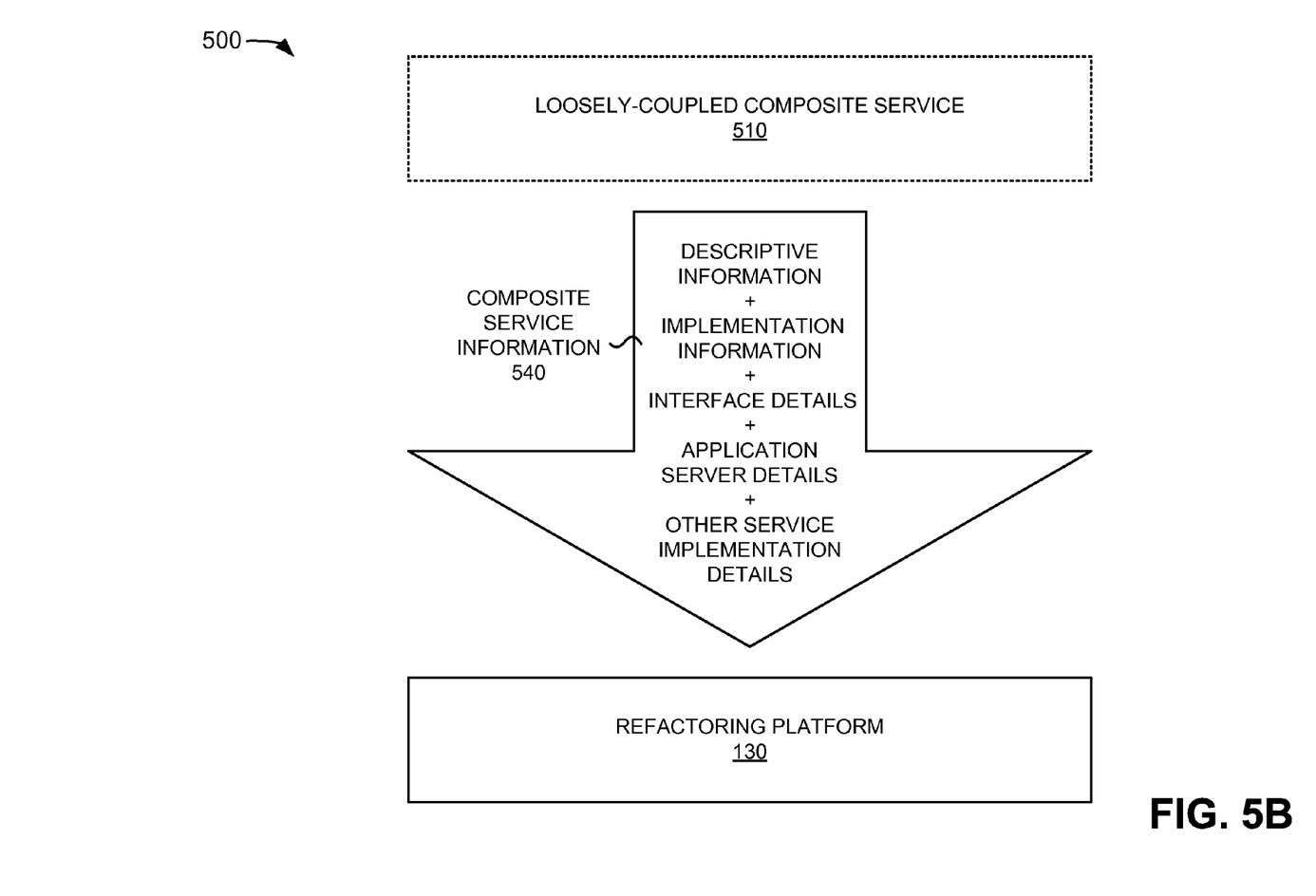

As illustrated in FIG. 5B, refactoring platform 130 may obtain composite service information 540 from loosely-coupled composite service 510. As illustrated and as discussed above, composite service information 540 may include descriptive information for location web service 512, address book web service 514, and calendar web service 516; implementation information for location web service 512, address book web service 514, and calendar web service 516; application server 520-to-location web service 512 interface details; application server 520-to-address book web service interface details; application server 520-to-calendar web service interface details; information relating to application server 520; and/or other implementation details relating to loosely-coupled composite service 510 (such as latency information relating to location web service 512, address book web service 514, and calendar web service 516, network topology information regarding the geographic locations of devices used to implement loosely-coupled composite service 510, and/or other information).

Figure 5C:
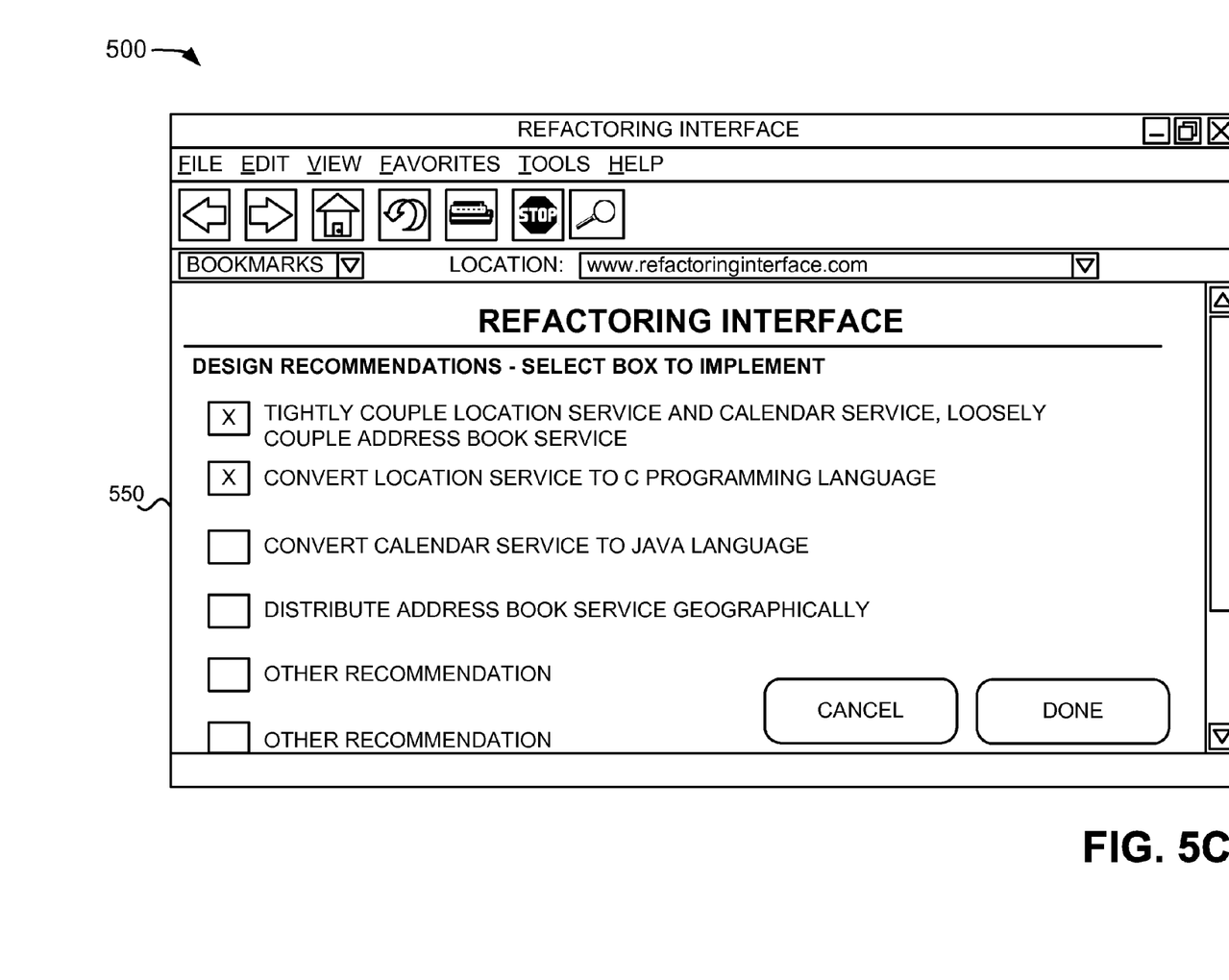

Refactoring platform 130 may analyze the obtained information to identify one or more design recommendations for forming the target composite service in the manner described above with respect to FIG. 4. As illustrated in FIG. 5C, refactoring platform 130 may provide a graphical user interface 550 to the product designer. Graphical user interface 550 may provide the design recommendations identified by refactoring platform 130. In example 500, graphical user interface 550 provides a recommendation that it would be advantageous to form target composite service by tightly coupling location web service 512 and calendar web service 516 and loosely coupling address book web service 514; a recommendation that it would be advantageous to form target composite service by rewriting location web service 512 in the C programming language; a recommendation that it would be advantageous to form target composite service by rewriting calendar web service 516 in the Java language; a recommendation that it would be advantageous to form target composite service by geographically distributing devices that implement address book web service 514; and/or other recommendations.

The product designer may select one or more of the provided design recommendations. In example 500, assume that the product designer selects the recommendation to tightly couple location web service 512 and calendar web service 516 and loosely couple address book web service 514 and the recommendation to rewrite location web service 512 in the C programming language.

Figure 5D:
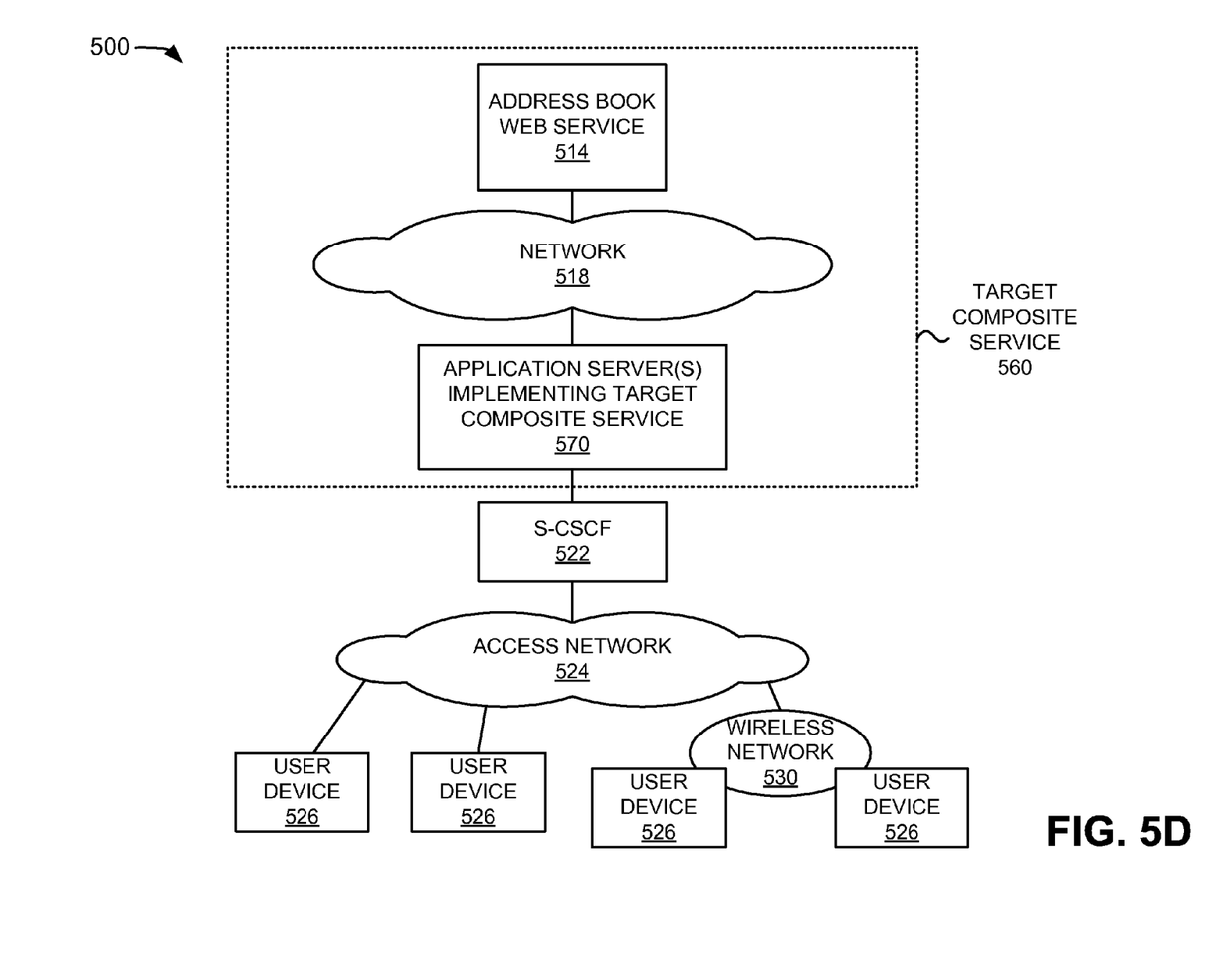

Refactoring platform 130 may then re-factor loosely-coupled composite service 510 to form target composite service 560, as illustrated in FIG. 5D. Target composite service 560 may be implemented on an application server 570. In example 500, refactoring platform 130 may rewrite location web service 512 in the C programming language. In addition, refactoring platform 130 may form target composite service 560 by tightly coupling location web service 512 and calendar web service 516 within application server 570, while address book web service 514 remains loosely coupled (where application server 570 accesses address book web service 514 through network 518).

Systems and methods, as described herein, provide the ability to re-factor a rapidly developed, loosely-coupled composite service into a high performance, high reliability, and massively scalable version of the composite service. In addition, systems and methods, as described herein, provide the capability of analyzing composite service execution and service building blocks to provide informed re-factoring decisions based on composite service building block interaction analysis, composite service session flows, composite service building block messaging resource requirements (e.g., message sizes, content types, etc.), composite service latencies and performance characteristics, composite service execution environment resource requirements (e.g., memory, processor utilization, threads, input/output requirements, etc.). Further, systems and methods, as described herein, provide the ability to allow a user to make service building block coupling decisions during the refactoring process.

The foregoing description of embodiments provides illustration and description, but is not intended to be exhaustive or to limit the invention to the precise form disclosed. Modifications and variations are possible in light of the above teachings or may be acquired from practice of the invention. For example, while a series of blocks has been described with regard to FIG. 4, the order of the blocks may be modified in other embodiments. Further, non-dependent blocks may be performed in parallel.

It will be apparent that embodiments, as described herein, may be implemented in many different forms of software, firmware, and hardware in the embodiments illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain portions, described above, may be implemented as a component that performs one or more functions. A component, as used herein, may include hardware, such as a processor, ASIC, or FPGA, or a combination of hardware and software (e.g., a processor executing software).

Even though particular combinations of features are recited in the claims and/or disclosed in the specification, these combinations are not intended to limit the disclosure of the invention. In fact, many of these features may be combined in ways not specifically recited in the claims and/or disclosed in the specification.

It should be emphasized that the terms "comprises/comprising" when used in the this specification are taken to specify the presence of stated features, integers, steps, or components, but do not preclude the presence or addition of one or more other features, integers, steps, components, or groups thereof.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A network device comprising:
one or more processors to:
obtain information relating to a loosely-coupled composite service,
the loosely-coupled composite service including a plurality of services, and
the plurality of services including a first service, a second service, and a third service
determine one or more design recommendations by analyzing the information relating to the loosely-coupled composite service, and
re-factor the loosely-coupled composite service to form a target composite service based on at least one of the one or more design recommendations,
the target composite service comprising the first service and the third service tightly coupled within one or more servers while the second service remains loosely coupled,
the second service remaining implemented outside of the one or more servers and the one or more servers accessing the second service via a network due to the second service being loosely coupled to the one or more servers, and
the one or more processors are to re-factor the loosely-coupled composite service based on the at least one of the one or more design recommendations by:
converting the plurality of services into Open Services Gateway initiative service components,
converting interfaces of the plurality of services into inter-process communications interfaces,
creating an Open Services Gateway initiative Manifest for description, maintenance, and upgrade of the Open Services Gateway initiative service components, and
producing the target composite service as an Open Services Gateway initiative bundle.

2. The network device of claim 1, where, when obtaining the information relating to the loosely-coupled composite service, the one or more processors are to at least one of:
obtain descriptive information that describes the plurality of services by using at least one of Universal Description Discovery and Integration (UDDI), Web Services Inspection Language (WSIL), or Web Services Description Language (WSDL),
obtain source code for at least one service of the plurality of services,
obtain information relating to messages transmitted to or from the plurality of services,
obtain latency information relating to the plurality of services,
obtain performance characteristics of the plurality of services,
obtain information relating to the one or more servers, or
obtain geographic locations of devices used to implement the loosely-coupled composite service.

3. The network device of claim 1, where the one or more processors are further to:
provide information regarding the one or more design recommendations, and
receive information indicating a selection of the at least one of the one or more design recommendations.

4. The network device of claim 1, where each of the one or more design recommendations improves at least one of performance, reliability, or scalability of the plurality of services.

5. The network device of claim 1, where, when determining the one or more design recommendations by analyzing the information relating to the loosely-coupled composite service, the one or more processors are to perform at least one of:
a traffic analysis of traffic transmitted to or from the plurality of services,
a performance analysis of source code of at least one service of the plurality of services to identify one or more sections of the source code to be rewritten in a different programming language,
a network latency analysis of latency information relating to the plurality of services, or
a topology analysis of information identifying geographic locations of devices used to implement the plurality of services,
the information relating to the loosely-coupled composite service including one or more of the traffic, the source code, the latency information, or the information identifying the geographic locations of the devices.

6. A method comprising:
receiving, by a refactoring platform, information relating to a loosely-coupled composite service,
the loosely-coupled composite service including a plurality of services, and
the plurality of services including a first service, a second service, and a third service;
determining, by the refactoring platform, one or more design recommendations by analyzing the information relating to the loosely-coupled composite service;
receiving, by the refactoring platform and from a user, an input that indicates a selection of at least one design recommendation of the one or more design recommendations; and
refactoring, by the refactoring platform and based on the input that indicates the selection of the at least one design recommendation, the loosely-coupled composite service to form a target composite service,
the target composite service comprising the first service and the third service tightly coupled within one or more servers while the second service remains loosely coupled,
the second service remaining implemented outside of the one or more servers and the one or more servers accessing the second service via a network due to the second service being loosely coupled to the one or more servers, and
refactoring the loosely-coupled composite service based on the input that indicates the selection of the at least one design recommendation by:
converting the plurality of services into Open Services Gateway initiative service components,
converting interfaces of the plurality of services into inter-process communications interfaces,
creating an Open Services Gateway initiative Manifest for description, maintenance, and upgrade of the Open Services Gateway initiative service components, and
producing the target composite service as an Open Services Gateway initiative bundle.

7. The method of claim 6,
where the information relating to the loosely-coupled composite service includes descriptive information for the plurality of services, and
where the descriptive information includes two or more of:
information identifying one or more entities that control the plurality of services,
information identifying capabilities of the plurality of services,
information indicating how the plurality of services work, or
information for constructing one or more classes for the plurality of services.

8. The method of claim 6, where the information relating to the loosely-coupled composite service includes source code for at least one of the first service or the second service.

9. The method of claim 8,
where the source code is in a first programming language, and
where the one or more design recommendations include:
a design recommendation to convert all or a portion of the source code from the first programming language to a second programming language,
where the first programming language is different from the second programming language.

10. The method of claim 6,
where receiving the information relating to the loosely-coupled composite service includes:
receiving messages transmitted between the plurality of services and the one or more servers, and
determining, based on the messages, interface information regarding at least one interface between the plurality of services and the one or more servers, and
where the information relating to the loosely-coupled composite service includes the interface information.

11. The method of claim 6,
where the information relating to the loosely-coupled composite service includes information regarding the one or more servers.

12. The method of claim 6,
where the information relating to the loosely-coupled composite service includes at least one of:
information regarding network latency relating to accessing the plurality of services of the loosely-coupled composite service, or
information regarding geographic locations of devices used in implementing the loosely-coupled composite service.

13. The method of claim 6, where refactoring the loosely-coupled composite service includes:
converting a messaging interface of the first service or the second service into an inter-process communications interface.

14. A non-transitory computer-readable medium storing instructions, the instructions comprising:
one or more instructions that, when executed by one or more processors, cause the one or more processors to:
receive information relating to a loosely-coupled composite service,
the loosely-coupled composite service including a plurality of services, and
the plurality of services including a first service, a second service, and a third service;
determine one or more design recommendations by analyzing the information relating to the loosely-coupled composite service, and
re-factor the loosely-coupled composite service to form a target composite service based on at least one of the one or more design recommendations,
the target composite service comprising the first service and the third service tightly coupled within one or more servers while the second service remains loosely coupled,
the second service remaining implemented outside of the one or more servers and the one or more servers accessing the second service via a network due to the second service being loosely coupled to the one or more servers, and
the one or more instructions that, when executed by the one or more processors, cause the one or more processors to re-factor the loosely-coupled composite service based on the at least one of the one or more design recommendations by:
converting the plurality of services into Open Services Gateway initiative service components,
converting interfaces of the plurality of services into inter-process communications interfaces,
creating an Open Services Gateway initiative Manifest for description, maintenance, and upgrade of the Open Services Gateway initiative service components, and producing the target composite service as an Open Services Gateway initiative bundle.

15. The non-transitory computer-readable medium of claim 14, the instructions further comprising:
one or more instructions that, when executed by the one or more processors, cause the one or more processors to:
provide information regarding the one or more design recommendations; and
receive information regarding a selection of the at least one of the one or more design recommendations.

16. The non-transitory computer-readable medium of claim 14, where each of the one or more design recommendations improves at least one of a performance, a reliability, or a scalability of the plurality of services.

17. The non-transitory computer-readable medium of claim 14, where the one or more instructions to re-factor the loosely-coupled composite service include:
one or more instructions that, when executed by the one or more processors, cause the one or more processors to:
produce the target composite service for the first service and the second service to run as a bundle within a virtual machine.

\* \* \* \* \*